United States Patent
Zhao et al.

(10) Patent No.: US 12,441,202 B2
(45) Date of Patent: Oct. 14, 2025

(54) BATTERY CHARGING AND SWAP STATION, THERMAL MANAGEMENT SYSTEM AND CONTROL METHOD THEREFOR, CONTROL DEVICE, AND MEDIUM

(71) Applicant: NIO TECHNOLOGY (ANHUI) CO., LTD, Hefei (CN)

(72) Inventors: Haibin Zhao, Shanghai (CN); Lijian Xia, Shanghai (CN); Yuting Zhang, Shanghai (CN); Chao Yang, Shanghai (CN); Yue Zhu, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 563 days.

(21) Appl. No.: 18/065,432

(22) Filed: Dec. 13, 2022

(65) Prior Publication Data
US 2023/0191930 A1 Jun. 22, 2023

(30) Foreign Application Priority Data
Dec. 17, 2021 (CN) .......................... 202111555432.5

(51) Int. Cl.
*H02J 7/00* (2006.01)
*B60L 53/302* (2019.01)
(Continued)

(52) U.S. Cl.
CPC .............. *B60L 53/302* (2019.02); *B60L 53/80* (2019.02); *H01M 10/615* (2015.04);
(Continued)

(58) Field of Classification Search
CPC .... B60L 53/302; B60L 53/80; H01M 10/615; H02J 7/0045; H05K 7/20354; H05K 7/20381; H05K 7/2039; H05K 7/20318
(Continued)

(56) References Cited

U.S. PATENT DOCUMENTS 11,447,036 B2 * 9/2022 Honjo ................. H01M 10/613
11,458,812 B2 * 10/2022 Jeong ................. B60H 1/00921
(Continued)

FOREIGN PATENT DOCUMENTS

| CN | 108583348 | 9/2018 |
| CN | 109037831 | 12/2018 |

(Continued)

OTHER PUBLICATIONS

Official Action with Machine Translation for China Patent Application No. 202111555432.5, dated Apr. 25, 2025, 18 pages.

*Primary Examiner* — Alexis B Pacheco
(74) *Attorney, Agent, or Firm* — Sheridan Ross P.C.

(57) ABSTRACT

The disclosure relates to the technical field of thermal management of a battery charging and swap station, and in particular to a battery charging and swap station, a thermal management system therefor, a control method for a thermal management system, a control device, and a computer-readable storage medium. The thermal management system includes: a heat pump unit including a compressor, a condenser, a throttling component, and an evaporator which form a refrigerant circulation circuit; a first liquid cooling unit including a charging module and the evaporator which form a first coolant circulation circuit; a second liquid cooling unit including a traction battery portion and the evaporator which form a second coolant circulation circuit; and a third liquid cooling unit including a charging terminal and the evaporator which form a third coolant circulation circuit, where the first and/or the third liquid cooling unit can be in communication with the second liquid cooling unit, so as to transfer heat recovered by the first and/or third liquid cooling unit to the traction battery portion. With such a configuration, a thermal management of the battery charging and swap station can be realized through liquid cooling.

20 Claims, 6 Drawing Sheets

(51) Int. Cl.
*B60L 53/80* (2019.01)
*H01M 10/615* (2014.01)
*H02J 7/14* (2006.01)
*H05K 7/20* (2006.01)

(52) U.S. Cl.
CPC ........ *H02J 7/0045* (2013.01); *H05K 7/20354* (2013.01); *H05K 7/20381* (2013.01); *H05K 7/20309* (2013.01); *H05K 7/20318* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 11,752,836 | B1 * | 9/2023 | Johnston | B60H 1/32011 62/239 |
| 11,807,066 | B2 * | 11/2023 | Hwang | B60H 1/00878 |
| 12,296,648 | B2 * | 5/2025 | Chen | B60H 1/00885 |
| 2010/0025125 | A1 * | 2/2010 | Bienert | B60H 1/32284 429/120 |
| 2016/0107503 | A1 * | 4/2016 | Johnston | B60H 1/00278 165/202 |
| 2022/0355645 | A1 * | 11/2022 | Jeong | B60H 1/00664 |
| 2023/0226877 | A1 * | 7/2023 | Hu | H01M 10/6568 62/79 |
| 2024/0162530 | A1 * | 5/2024 | Lee | B60H 1/143 |

FOREIGN PATENT DOCUMENTS

| | | |
|---|---|---|
| CN | 109435734 | 3/2019 |
| CN | 212667170 | 3/2021 |
| CN | 113054276 | 6/2021 |
| CN | 113263959 | 8/2021 |
| CN | 113765188 | 12/2021 |
| CN | 216300810 | 4/2022 |
| WO | WO 2021/129875 | 7/2021 |

* cited by examiner

BATTERY CHARGING AND SWAP STATION, THERMAL MANAGEMENT SYSTEM AND CONTROL METHOD THEREFOR, CONTROL DEVICE, AND MEDIUM

CROSS-REFERENCE TO RELATED APPLICATIONS

This application claims the benefit of China Patent Application No. 202111555432.5 filed Dec. 17, 2021, the entire contents of which are incorporated herein by reference in its entirety.

TECHNICAL FIELD

The disclosure relates to the technical field of thermal management of a battery charging and swap station, and particularly provides a battery charging and swap station, a thermal management system for a battery charging and swap station, a control method for a thermal management system for a battery charging and swap station, a control device, and a computer-readable storage medium.

BACKGROUND

As the automotive industry develops, and the energy and environment issues become a focus of attention across the world, the new energy vehicles have been popularized in a wide range. For example, among the new energy vehicles, a battery electric vehicle mainly relies on a traction battery as its power source. Unlike the traditional fuel vehicles, it is required to replenish the traction battery with energy. For example, the energy replenishment methods mainly include charging the traction battery (charging mainly includes rapid charging (as little as 30 min) and slow charging (6 h-7 h)), and directly replacing a used battery with a fully-charged traction battery (battery swap). A battery charging and swap station is an energy replenishment mechanism that can provide charging and battery swap services for electric vehicles.

Specifically, for the battery swap service, it is difficult to provide the direct battery swap service for all makes of electric vehicles, so the charging service is added on the basis of the battery swap service. For example, in the battery charging and swap station providing both the battery swap service and the charging service, charging piles with high power (over 180 kW) are configured so as to form a service mode integrating battery charging and battery swap, thereby satisfying the energy replenishment requirement of electric vehicles to the maximum extent.

The battery charging and swap stations are undertaking increasingly larger scale of services along with the rising electric vehicle ownership. To realize high-power charging and energy replenishment effect, charging racks for replenishing traction batteries needing the battery swap service with energy, charging piles for replenishing electric vehicles needing the charging service with energy, etc. are all required to be in a working state for a long time, so that thermal management is necessary for relevant components in the battery charging and swap station.

Accordingly, a novel technical solution is required in the art, to solve the problems described above.

BRIEF SUMMARY

Technical Problem

The disclosure is provided to solve the technical problems described above at least to a certain extent, and to realize thermal management of relevant components in a battery charging and swap station at least to a certain extent.

Technical Solution

In view of above, in a first aspect, the disclosure provides a thermal management system for a battery charging and swap station. The battery charging and swap station includes a charging module, a traction battery portion, and a charging terminal, the charging module being electrically connected to the traction battery portion and the charging terminal, so as to provide electric energy for the traction battery portion and the charging terminal, the traction battery portion being capable of providing an energy replenishment service for a traction battery accommodated therein, and the charging terminal being capable of being electrically connected to an electric vehicle arriving at the station, so as to provide an energy replenishment service for a traction battery configured in the electric vehicle. The thermal management system includes: a heat pump unit including a compressor, a condenser, a throttling component, and an evaporator which form a refrigerant circulation circuit; a first liquid cooling unit including the charging module and the evaporator which form a first coolant circulation circuit; a second liquid cooling unit including the traction battery portion and the evaporator which form a second coolant circulation circuit; and a third liquid cooling unit including the charging terminal and the evaporator which form a third coolant circulation circuit; where the first liquid cooling unit and/or the third liquid cooling unit can be in communication with the second liquid cooling unit, so as to transfer heat recovered by the first liquid cooling unit and/or the third liquid cooling unit to the traction battery portion.

With such a configuration, thermal management of the battery charging and swap station can be realized through liquid cooling.

A working principle of the heat pump unit is explained hereinafter. As a refrigerant flows in a circuit formed by the compressor, the condenser, the throttling component, the evaporator, and the compressor circularly, along with a phase change of the refrigerant, a surface of the evaporator is capable of providing available cold energy (the surface of the condenser provides available heat), and for example, the throttling component is capable of being a capillary tube, an electronic expansion valve, etc. In the disclosure, during the thermal management of the battery charging and swap station, the cold energy provided by the surface of the evaporator is mainly used.

Specifically, among heat-related components in the battery charging and swap station, a traction battery is required to be within a set temperature range constantly, possibly resulting in two requirements of heat replenishment and heat recovery. Owing to a large current, heat will be generated in the charging terminal (such as a charging pile, etc.) in a charging process, so that the heat is required to be recovered. When the charging module provides energy for the traction battery, similar to the charging terminal, owing to a large current, heat is required to be recovered.

In view of the above, the disclosure firstly introduces one heat pump unit, upon which the three liquid cooling units corresponding to the aforementioned components exchange heat with the evaporator that emits the cold energy, thereby recovering the heat. On this premise, as mentioned above, since an electric battery is also capable of requiring heat replenishment, the second liquid cooling unit is configured with the heating component, so as to ensure that the traction battery is capable of being within a temperature range matching performance thereof constantly.

It is to be understood that a person skilled in the art is capable of determining specific forms of the first/third liquid cooling units and communication manners with the second liquid cooling unit according to actual requirements. For example, constituent elements of the first/second/third liquid cooling units are capable of being the same as or not, the first/second/third liquid cooling units are capable of being arranged independently of one another or integrated to a certain extent, the first/third liquid cooling units are not capable of exchanging heat with each other or are capable of exchanging heat with each other to a certain extent, and the first/third liquid cooling units are capable of being both or either in communication with the second liquid cooling unit in a direct or indirect manner. For example, the first liquid cooling unit and the third liquid cooling unit are two branches of one main circuit, the two branches not exchanging heat with each other, and being both in communication with the second liquid cooling unit. The first liquid cooling unit includes two water vessels, one of which is a water vessel shared with the third liquid cooling unit, the other one of which is independently configured, the two water vessels being each configured with pumps. The first liquid cooling unit is in direct communication with the second liquid cooling unit, and the third liquid cooling unit is in indirect communication with the second liquid cooling unit through the first liquid cooling unit (or another newly added pipeline, etc.).

For the thermal management system for a battery charging and swap station described above, in one possible implementation, at least the second liquid cooling unit is configured with the heating component.

With such a configuration, the traction battery accommodated in the traction battery portion is capable of being subjected to temperature rise processing, so that the traction battery is capable of being within the set temperature range more constantly.

It is to be understood that a person skilled in the art is capable of determining a specific form of the heating component and a manner for arranging the heating component on the second liquid cooling unit according to actual requirements, one or more heating components are capable of being provided, and the heating component is capable of directly or indirectly heating the traction battery. For example, a pipeline is additionally arranged on the second liquid cooling unit, and a third heating component is arranged on the pipeline. The heating component is configured on a relevant component of the second liquid cooling unit, and the heating component indirectly heat the traction battery by heating the relevant component. The second liquid cooling unit is provided with the heating component that is capable of directly heating the traction battery at a position corresponding to the traction battery.

Except for the second liquid cooling unit, a heating component is capable of being provided for the fourth liquid cooling unit, etc. For example, the second liquid cooling unit and the fourth liquid cooling unit are partially integrated, and share one heating component.

For the thermal management system for a battery charging and swap station described above, in one possible implementation, the battery charging and swap station is configured with an in-station air conditioning system, the in-station air conditioning system being capable of adjusting an ambient temperature in the battery charging and swap station. The thermal management system includes: a fourth liquid cooling unit including the in-station air conditioning system and the evaporator which form a fourth coolant circulation circuit.

With such a configuration, the in-station air conditioning system can better keep an in-station space within a desired temperature range with the assistance of the heat pump unit.

For the thermal management system for a battery charging and swap station described above, in one possible implementation, the first liquid cooling unit and/or the third liquid cooling unit are/is capable of being in communication with the fourth liquid cooling unit, so that heat recovered by the first liquid cooling unit and/or the third liquid cooling unit is used for adjusting the ambient temperature in the battery charging and swap station With such a configuration, the in-station air conditioning system can better keep the in-station space within the desired temperature range with the assistance of recovered waste heat.

It is to be understood that a person skilled in the art is capable of determining a specific form of the fourth liquid cooling unit and a communication manner with the first/third liquid cooling units according to actual requirements. Similar to the second aforementioned liquid cooling unit, the fourth liquid cooling unit is capable of having the same constituent elements as the first/second/third liquid cooling units or not, and the first/third liquid cooling units are capable of being both or either in communication with the fourth liquid cooling unit in a direct or indirect manner. In addition, configurations of the first/third liquid cooling units are capable of being flexibly set according to actual requirements, for example, the first/fourth liquid cooling units are not capable of exchanging heat with each other, or are capable of exchanging heat to a certain extent, or being integrated to a certain extent.

For the thermal management system for a battery charging and swap station described above, in one possible implementation, the second liquid cooling unit and/or the fourth liquid cooling unit are/is configured with heating components/a heating component.

With such a configuration, a specific configuration manner of the heating component is provided.

It is to be understood that a person skilled in the art is capable of determining the number of the heating component and a manner for the heating component to assist the second liquid cooling unit and/or the fourth liquid cooling unit with heat provision according to actual situations. For example, as two independent units, the second liquid cooling unit and the fourth liquid cooling unit are each provided with one heating component. The second liquid cooling unit and the fourth liquid cooling unit have a common pipeline, and one or more heating components are arranged on the common pipeline. A pipeline is additionally arranged outside the second liquid cooling unit and the fourth liquid cooling unit, one or more heating components are configured on the pipeline, and a communication manner of the pipeline and a working form of the heating components are controlled to assist the second liquid cooling unit and/or the fourth liquid cooling unit with heat provision.

For the thermal management system for a battery charging and swap station described above, in one possible implementation, the thermal management system includes a first vessel, a second vessel, and a third vessel, the first vessel, the second vessel, and the third vessel being configured with a first pump, a second pump and a third pump, respectively, the first vessel, the first pump, and the charging module forming the first liquid cooling unit, the second vessel, the second pump, and the traction battery portion forming the second liquid cooling unit, and the third vessel, the third pump, and the charging terminal forming the third liquid cooling unit.

With such a configuration, a specific form of the first/second/third liquid cooling units is provided.

It is to be understood that when permitted, the configurations described above are capable of being integrated to a certain extent. For example, the first/third liquid cooling units share the vessels and the pumps, that is, the first vessel and the third vessel are integrated, and the first pump and the third pump are integrated.

For the thermal management system for a battery charging and swap station described above, in one possible implementation, the thermal management system includes a fourth vessel, the fourth vessel being configured with a fourth pump, the fourth vessel, the fourth pump, and the in-station air conditioning system forming the fourth liquid cooling unit.

With such a configuration, a specific form of the fourth liquid cooling unit is provided.

Similar to the first/second/third aforementioned liquid cooling units, when permitted, the configurations described above are capable of being integrated to a certain extent. For example, the second/fourth liquid cooling units share the vessels and the pumps, that is, the second vessel and the fourth vessel are integrated, and the second pump and the fourth pump are integrated.

For the thermal management system for a battery charging and swap station described above, in one possible implementation, the first liquid cooling unit and the third liquid cooling unit are provided with a common first main pipe, the second liquid cooling unit and the fourth liquid cooling unit are provided with a common second main pipe, and the thermal management system includes a three-way valve, a first port, a second port, and a third port of the three-way valve being connected to the first main pipe, the second main pipe, and the evaporator, respectively.

With such a configuration, a specific structural form of the thermal management system is provided.

For the thermal management system for a battery charging and swap station described above, in one possible implementation, the thermal management system includes a fifth vessel, the fifth vessel being arranged on the second main pipe, and the heating component being configured at the fifth vessel.

With such a configuration, a specific presentation manner that the heating component assists the traction battery/the in-station air conditioning system with a heat management requirement is provided.

It is to be understood that when permitted, the configurations described above are capable of being integrated to a certain extent. For example, the second/fourth liquid cool units share the vessel and the pumps, and the heating component is directly arranged on the vessel, that is, the second vessel, the fourth vessel, and the fifth vessel are integrated. The second/fourth liquid cooling units are provided with two vessels, one of which is used as an integrated vessel of the second vessel and the fourth vessel, the other of which is used as the fifth vessel, the heating component being directly arranged on the fifth vessel. In addition, the fifth vessel is also capable of being provided with a pump, if necessary.

For the thermal management system for a battery charging and swap station described above, in one possible implementation, the second vessel and/or the fourth vessel are/is arranged to allow communication with the first vessel and/or the third vessel.

With such a configuration, a specific structural form of the thermal management system is provided.

Specifically, with such a configuration, the second vessel and/or the fourth vessel, and the first vessel and/or the third vessel can be used in common when a coolant is contained. For example, a capacity of the second vessel and/or the fourth vessel is capable of being increased with the assistance of the first vessel and/or the third vessel.

For the thermal management system for a battery charging and swap station described above, in one possible implementation, the thermal management system includes a switching valve that is capable of being switched between on and off, the switching valve being arranged in parallel with the second pump and/or the fourth pump.

With such a configuration, a specific structural form of the thermal management system is provided. For example, the switching valve is capable of being a solenoid valve, etc.

In a second aspect, the disclosure provides a control method for a thermal management system for a battery charging and swap station. The battery charging and swap station includes a charging module, a traction battery portion, and a charging terminal, the charging module being electrically connected to the traction battery portion and the charging terminal, so as to provide electric energy for the traction battery portion and the charging terminal, the traction battery portion being capable of providing an energy replenishment service for a traction battery accommodated therein, and the charging terminal being capable of being electrically connected to an electric vehicle arriving at the station, so as to provide an energy replenishment service for a traction battery configured in the electric vehicle. The battery charging and swap station is provided with the thermal management system, and the thermal management system includes a heat pump unit, the heat pump unit including a compressor, a condenser, a throttling component, and an evaporator which form a refrigerant circulation circuit. The control method includes: causing a coolant to recover heat of the charging module and/or the charging terminal; and causing the coolant carrying heat to exchange heat with the evaporator under the condition that at least a temperature level of the traction battery portion is satisfied, and there is a surplus of heat.

With such a configuration, waste heat of the charging module and the charging terminal can be recovered in time, and the recovered waste heat is transferred to the traction battery portion when the traction battery portion requires the heat.

For the control method described above, in one possible implementation, the thermal management system includes: a first liquid cooling unit including the charging module and the evaporator which form a first coolant circulation circuit; a second liquid cooling unit including the traction battery portion and the evaporator which form a second coolant circulation circuit; and a third liquid cooling unit including the charging terminal and the evaporator which form a third coolant circulation circuit. The "causing a coolant to recover heat of the charging module and/or the charging terminal" includes: causing the first liquid cooling unit and/or the second liquid cooling unit to be in circulation states/a circulation state. The condition that "at least a temperature level of the traction battery portion is satisfied" includes: causing the first liquid cooling unit and/or the third liquid cooling unit to be in communication with the second liquid cooling unit, so that the temperature level of the traction battery portion is satisfied.

With such a configuration, a specific implementation form of the thermal management system is provided (thermal management of the charging module, the charging terminal, and the traction battery portion is realized based on the three liquid cooling units configured).

For the control method described above, in one possible implementation, the battery charging and swap station is configured with an in-station air conditioning system, the in-station air conditioning system being capable of adjusting an ambient temperature in the battery charging and swap station. The "causing the coolant carrying the heat to exchange heat with the evaporator under the condition that at least a temperature level of the traction battery portion is satisfied, and there is a surplus of heat" includes: causing the coolant carrying heat to exchange heat with the evaporator under the condition that the ambient temperature and the temperature level of the traction battery portion are satisfied, and there is a surplus of heat.

With such a configuration, a specific form of the thermal management system is provided (the in-station air conditioning system is taken as the focus of the thermal management system).

For the control method described above, in one possible implementation, the thermal management system includes: a fourth liquid cooling unit including the in-station air conditioning system and the evaporator which form a fourth coolant circulation circuit. The "ambient temperature is satisfied" includes: causing the first liquid cooling unit and/or the third liquid cooling unit to be in communication with the fourth liquid cooling unit, so that the ambient temperature is satisfied.

With such a configuration, a specific implementation form of the control method for a thermal management system is provided (a temperature of an in-station space is adjusted based on the fourth liquid cooling unit configured).

For the control method described above, in one possible implementation, the battery charging and swap station is configured with a heating component. The control method includes: turning on the heating component under the condition that the heat is not enough to cope with the ambient temperature and the temperature level of the traction battery portion being satisfied.

With such a configuration, a specific implementation form of the control method for a thermal management system is provided (how to raise the temperature of the traction battery portion).

For the control method described above, in one possible implementation, the thermal management system includes a first vessel, a second vessel, a third vessel, and a fourth vessel, the first vessel and the third vessel being each configured with a first pump, a second pump, a third pump, and a fourth pump, the first vessel, the first pump, and the charging module forming the first liquid cooling unit, the second vessel, the second pump, and the traction battery portion forming the second liquid cooling unit, the third vessel, the third pump, and the charging terminal forming the third liquid cooling unit, and the fourth vessel, the fourth pump, and the in-station air conditioning system forming the fourth liquid cooling unit.

With such a configuration, a specific structural form of the thermal management system is provided.

For the control method described above, in one possible implementation, the first liquid cooling unit and the third liquid cooling unit are provided with a common first main pipe, the second liquid cooling unit and the fourth liquid cooling unit are provided with a common second main pipe, and the thermal management system includes a three-way valve, a first port, a second port, and a third port of the three-way valve being connected to the first main pipe, the second main pipe, and the evaporator, respectively. The "causing the coolant carrying the heat to exchange heat with the evaporator" includes: causing the third port to be in communication with the first port and/or the second port.

With such a configuration, a specific implementation form of the control method for a thermal management system is provided (the three-way valve is switched between on and off).

For the control method described above, in one possible implementation, the thermal management system includes a switching valve that is capable of being switched between on and off, the switching valve being arranged in parallel with the second pump and/or the fourth pump. The control method includes: closing the second pump and/or the fourth pump, and opening the switching valve under the condition that the coolant carrying heat is required to cope with the ambient temperature and the temperature level of the traction battery portion; and opening the second pump and/or the fourth pump, and closing the switching valve under the condition that the coolant carrying heat exchanges heat with the evaporator.

With such a configuration, a specific implementation form of the control method for a thermal management system is provided (the switching valve and working states/a working state of the second pump and/or the fourth pump are adjusted).

For the control method described above, in one possible implementation, the thermal management system includes a fifth vessel, the fifth vessel being arranged on the second main pipe, and the heating member being arranged at the fifth vessel.

With such a configuration, a specific presentation manner that the heating component assists the traction battery/the in-station air conditioning system with a thermal management requirement is provided (sharing the heating component).

It is to be understood that the control method for a thermal management system for a battery charging and swap station described above corresponds to the aforementioned method for a thermal management system for a battery charging and swap station, and thus has all technical effects of any one of the aforementioned thermal management systems for battery charging and swap stations, which is not repeated herein.

In a third aspect, the disclosure provides a computer-readable storage medium. The storage medium is adapted to store a plurality of program codes, the program codes being adapted to be loaded for running by a processor, to execute any one of the aforementioned control methods for thermal management systems for battery charging and swap stations.

It is to be understood that the computer-readable storage medium has all technical effects of any one of the aforementioned control methods for thermal management systems for battery charging and swap stations, which is not repeated herein.

A person skilled in the art can understand that in the disclosure, a computer program is capable of instructing relevant hardware, to implement some or all of procedures of the control method for a thermal management system for a battery charging and swap station. The computer program is capable of being stored in one computer-readable storage medium. The computer program is capable of implementing steps of each method embodiment described above when executed by a processor. The computer program includes a computer program code. It is to be understood that the program code includes, but is not limited to, a program code for executing the control method for a thermal management system for a battery charging and swap station described above. For the ease of description, only portions related to the disclosure are shown. The computer program code is capable of being in the form of a source code, an object code, or an executable file, or in certain intermediate form, etc. The computer-readable storage medium is capable of including: any entity or device that can carry the computer program code, such as a medium, a universal serial bus flash disk, a removable hard disk, a magnetic disk, an optical disk, a computer memory, a read-only memory, a random access memory, an electrical carrier signal, a telecommunication signal, a software allocation medium, etc. It should be noted that the content encompassed in the computer-readable storage medium is capable of being appropriately added or deleted depending on requirements of the legislation and patent practice in a jurisdiction. For example, in some jurisdictions, according to the legislation and patent practice, the computer-readable storage medium does not include an electrical carrier signal and a telecommunication signal.

In a fourth aspect, the disclosure provides a control device. The control device includes a memory and a processor, the memory being adapted to store a plurality of program codes, and the program codes being adapted to be loaded for running by the processor, to execute any one of the aforementioned control methods for thermal management systems for battery charging and swap stations.

It is to be understood that the control device has all technical effects of any one of the aforementioned control methods for thermal management systems for battery charging and swap stations, which is not repeated herein. The control device is capable of a control device apparatus formed by various electronic apparatuses.

In a fifth aspect, the disclosure provides a control device, the control device including a control module, and the control module being configured to execute any one of the aforementioned control methods for thermal management systems for battery charging and swap stations.

It is to be understood that the control device has all technical effects of any one of the aforementioned control methods for thermal management systems for battery charging and swap stations, which is not repeated herein.

In the description of the disclosure, the "control module" is capable of including hardware, software, or a combination thereof. A module is capable of including a hardware circuit, various suitable sensors, a communication port, and a memory, or including a software portion, such as a program code, or is capable of being a combination of software and hardware. A processor is capable of a central processing unit, a microprocessor, an image processing unit, a digital signal processor, or any other suitable processor. The processor has a data and/or signal processing function. The processor is capable of being implemented in software, hardware, or a combination thereof. A non-transitory computer-readable storage medium includes any suitable medium that is capable of storing a program code, for example, a magnetic disk, a hard disk, an optical disk, a flash memory, a read-only memory, or a random access memory, etc.

Further, it should be understood that since the control module is merely configured to describe a functional unit in a system corresponding to the control method for a thermal management system for a battery charging and swap station of the disclosure, a physical device corresponding to the control module is capable of being a processor itself, or a part of software, a part of hardware, or a part of a combination of software and hardware in the processor. Therefore, one control module is provided only for example. It is to be understood by a person skilled in the art that the control module is capable of being adaptively split based on actual conditions. A specific split form of the control module does not cause the technical solution to depart from the principle of the disclosure. Therefore, the technical solutions after the split shall all fall within the scope of protection of the disclosure.

In a sixth aspect, the disclosure provides a battery charging and swap station, the battery charging and swap station including any one of the aforementioned thermal management systems for battery charging and swap stations. Alternatively, the battery charging and swap station includes the aforementioned control device.

It is to be understood that the battery charging and swap station has all technical effects of any one of the aforementioned control methods for thermal management systems for battery charging and swap stations, which is not repeated herein.

Proposal 1. A thermal management system for a battery charging and swap station, where the battery charging and swap station includes a charging module, a traction battery portion, and a charging terminal, the charging module being electrically connected to the traction battery portion and the charging terminal, so as to provide electric energy for the traction battery portion and the charging terminal, the traction battery portion being capable of providing an energy replenishment service for a traction battery accommodated therein, and the charging terminal being capable of being electrically connected to an electric vehicle arriving at the station, so as to provide an energy replenishment service for a traction battery configured in the electric vehicle; and the thermal management system includes:

a heat pump unit including a compressor, a condenser, a throttling component, and an evaporator which form a refrigerant circulation circuit;

a first liquid cooling unit including the charging module and the evaporator which form a first coolant circulation circuit;

a second liquid cooling unit including the traction battery portion and the evaporator which form a second coolant circulation circuit; and a third liquid cooling unit including the charging terminal and the evaporator which form a third coolant circulation circuit;

where the first liquid cooling unit and/or the third liquid cooling unit can be in communication with the second liquid cooling unit, so as to transfer heat recovered by the first liquid cooling unit and/or the third liquid cooling unit to the traction battery portion.

Proposal 2. The thermal management system for a battery charging and swap station according to Proposal 1, where at least the second liquid cooling unit is configured with a heating component.

Proposal 3. The thermal management system for a battery charging and swap station according to Proposal 1 or 2, where the battery charging and swap station is configured with an in-station air conditioning system, the in-station air conditioning system being capable of adjusting an ambient temperature in the battery charging and swap station; and the thermal management system includes:

a fourth liquid cooling unit including the in-station air conditioning system and the evaporator which form a fourth coolant circulation circuit.

Proposal 4. The thermal management system for a battery charging and swap station according to Proposal 3, where the first liquid cooling unit and/or the third liquid cooling unit are/is capable of being in communication with the fourth liquid cooling unit, so that the heat recovered by the first liquid cooling unit and/or the third liquid cooling unit is used for adjusting the ambient temperature in the battery charging and swap station.

Proposal 5. The thermal management system for a battery charging and swap station according to Proposal 3, where the second liquid cooling unit and/or the fourth liquid cooling unit are/is configured with heating components/a heating component.

Proposal 6. The thermal management system for a battery charging and swap station according to Proposal 5, further including a first vessel, a second vessel, and a third vessel, the first vessel, the second vessel, and the third vessel being configured with a first pump, a second pump and a third pump, respectively, the first vessel, the first pump, and the charging module forming the first liquid cooling unit, the second vessel, the second pump, and the traction battery portion forming the second liquid cooling unit, and the third vessel, the third pump, and the charging terminal forming the third liquid cooling unit.

Proposal 7. The thermal management system for a battery charging and swap station according to Proposal 6, further including a fourth vessel, the fourth vessel being configured with a fourth pump, and the fourth vessel, the fourth pump, and the in-station air conditioning system forming the fourth liquid cooling unit.

Proposal 8. The thermal management system for a battery charging and swap station according to Proposal 7, where the first liquid cooling unit and the third liquid cooling unit are provided with a common first main pipe, the second liquid cooling unit and the fourth liquid cooling unit are provided with a common second main pipe, and the thermal management system includes a three-way valve, a first port, a second port, and a third port of the three-way valve being connected to the first main pipe, the second main pipe, and the evaporator, respectively.

Proposal 9. The thermal management system for a battery charging and swap station according to Proposal 8, where the second liquid cooling unit includes a fifth vessel, the fifth vessel being arranged on the second main pipe, and the heating component being configured at the fifth vessel.

Proposal 10. The thermal management system for a battery charging and swap station according to Proposal 7, where the second vessel and/or the fourth vessel are/is arranged to allow communication with the first vessel and/or the third vessel.

Proposal 11. The thermal management system for a battery charging and swap station according to Proposal 10, including a switching valve that is capable of being switched between on and off, the switching valve being arranged in parallel with the second pump and/or the fourth pump.

Proposal 12. A control method for a thermal management system for a battery charging and swap station, where the battery charging and swap station includes a charging module, a traction battery portion, and a charging terminal, the charging module being electrically connected to the traction battery portion and the charging terminal, so as to provide electric energy for the traction battery portion and the charging terminal, the traction battery portion being capable of providing an energy replenishment service for a traction battery accommodated therein, and the charging terminal being capable of being electrically connected to an electric vehicle arriving at the station, so as to provide an energy replenishment service for a traction battery configured in the electric vehicle;

the battery charging and swap station is configured with the thermal management system, including:

a heat pump unit including a compressor, a condenser, a throttling component, and an evaporator which form a refrigerant circulation circuit; and the control method includes:

causing a coolant to recover heat of the charging module and/or the charging terminal; and causing the coolant carrying heat to exchange heat with the evaporator under the condition that at least a temperature level of the traction battery portion is satisfied, and there is a surplus of heat.

Proposal 13. The control method according to Proposal 12, where the thermal management system includes:

the "causing a coolant to recover heat of the charging module and/or the charging terminal" includes:

causing the first liquid cooling unit and/or the second liquid cooling unit to be in circulation states/a circulation state; and the condition that "at least a temperature level of the traction battery portion is satisfied" includes:

causing the first liquid cooling unit and/or the third liquid cooling unit to be in communication with the second liquid cooling unit, so that the temperature level of the traction battery portion is satisfied.

Proposal 14. The control method according to Proposal 13, where the battery charging and swap station is configured with an in-station air conditioning system, the in-station air conditioning system being capable of adjusting an ambient temperature in the battery charging and swap station; and the "causing the coolant carrying heat to exchange heat with the evaporator under the condition that at least a temperature level of the traction battery portion is satisfied, and there is a surplus of heat" includes:

causing the coolant carrying heat to exchange heat with the evaporator under the condition that the ambient temperature and the temperature level of the traction battery portion are satisfied, and there is a surplus of heat.

Proposal 15. The control method according to Proposal 14, where the thermal management system includes:

a fourth liquid cooling unit including the in-station air conditioning system and the evaporator which form a fourth coolant circulation circuit; and the "ambient temperature is satisfied" includes:

causing the first liquid cooling unit and/or the third liquid cooling unit to be in communication with the fourth liquid cooling unit, so that the ambient temperature is satisfied.

Proposal 16. The control method according to Proposal 15, where the battery charging and swap station is configured with a heating component; and the control method includes:

turning on the heating component under the condition that the heat is not enough to cope with the ambient temperature and the temperature level of the traction battery portion being satisfied.

Proposal 17. The control method according to Proposal 16, where the thermal management system includes a first vessel, a second vessel, a third vessel, and a fourth vessel, the first vessel and the third vessel being each configured with a first pump, a second pump, a third pump, and a fourth pump, the first vessel, the first pump, and the charging module forming the first liquid cooling unit, the second vessel, the second pump, and the traction battery portion forming the second liquid cooling unit, the third vessel, the third pump, and the charging terminal forming the third liquid cooling unit, and the fourth vessel, the fourth pump, and the in-station air conditioning system forming the fourth liquid cooling unit.

Proposal 18. The control method according to Proposal 17, where the first liquid cooling unit and the third liquid cooling unit are provided with a common first main pipe, the second liquid cooling unit and the fourth liquid cooling unit are provided with a common second main pipe, and the thermal management system includes a three-way valve, a first port, a second port, and a third port of the three-way valve being connected to the first main pipe, the second main pipe, and the evaporator, respectively; and the "causing the coolant carrying heat to exchange heat with the evaporator" includes: causing the third port to be in communication with the first port and/or the second port.

Proposal 19. The control method according to Proposal 18, where the thermal management system includes a switching valve that is capable of being switched between on and off, the switching valve being arranged in parallel with the second pump and/or the fourth pump; and the control method includes:

closing the second pump and/or the fourth pump, and opening the switching valve under the condition that the coolant carrying heat is required to cope with the ambient temperature and the temperature level of the traction battery portion; and opening the second pump and/or the fourth pump, and closing the switching valve under the condition that the coolant carrying heat exchanges heat with the evaporator.

Proposal 20. The control method according to Proposal 18, where the thermal management system includes a fifth vessel, the fifth vessel being arranged on the second main pipe, and the heating member being arranged at the fifth vessel.

Proposal 21. A computer-readable storage medium, being adapted to store a plurality of program codes, and the program codes being adapted to be loaded for running by a processor, to execute the control method for a thermal management system for a battery charging and swap station according to any one of Proposals 12-20.

Proposal 22. A control device, including a memory and a processor, the memory being adapted to store a plurality of program codes, and the program codes being adapted to be loaded for running by the processor, to execute the control method for a thermal management system for a battery charging and swap station according to any one of Proposals 12-20.

Proposal 23. A control device, including a control module, the control module being configured to execute the control method for a thermal management system for a battery charging and swap station according to any one of Proposals 12-20.

Proposal 24. A battery charging and swap station, including the thermal management system for a battery charging and swap station according to any one of Proposals 1-11, or the control device according to Proposal 23.

BRIEF DESCRIPTION OF THE SEVERAL VIEWS OF THE DRAWINGS

A thermal management system of the disclosure will be described below with reference to the drawings and a battery charging and swap station. In the accompanying drawings.

DETAILED DESCRIPTION

The preferred implementations of the disclosure are described below with reference to the accompanying drawings. A person skilled in the art should understand that these implementations are only used to explain the technical principles of the disclosure, and are not intended to limit the scope of protection of the disclosure. For example, although the implementation is described in combination with the first/third liquid cooling units being integrated, and the second/fourth liquid cooling units being integrated and sharing one fifth vessel and a heating component, the implementation is not intended to limit the scope of protection of the disclosure, and a person skilled in the art is capable of making changes without departing from the principle of the disclosure, such as providing one heating component for each of an in-station air conditioning system and a traction battery portion, etc.

It should be noted that in the description of the disclosure, the terms such as "center", "upper", "lower", "left", "right", "vertical", "horizontal", "inner", and "outer" that indicate directions or position relations are based on the directions or position relations shown in the accompanying drawings only for the ease of description, and do not indicate or imply that the device or element must have a specific orientation, or be constructed and operated in a specific orientation, and thus may not be interpreted as limiting the disclosure. In addition, the terms "first", "second", and "third" are for descriptive purposes only, and may not be interpreted as indicating or implying relative importance. The terms "a/an" and "this" in the singular form are also capable of including the plural form.

In addition, it should also be noted that in the description of the disclosure, unless explicitly defined and limited otherwise, the terms "mounted", "connected", and "connection" should be interpreted in a broad sense. For example, it may be a fixed connection, a detachable connection or an integral connection; it may be a mechanical connection, or an electrical connection; and it may be a direct connection, an indirect connection by means of an intermediate medium, or internal communication between two elements. For a person skilled in the art, the specific meanings of the terms described above in the disclosure are capable of being interpreted according to the specific conditions.

Moreover, for the better description of the disclosure, many details are provided in the following specific implementations, and a person skilled in the art should understand that, without certain specific details, the disclosure is still capable of being implemented. In some examples, working principles of charging and battery swap well known to a person skilled in the art are not described in detail, in order to highlight the gist of the disclosure.

Figure 1:
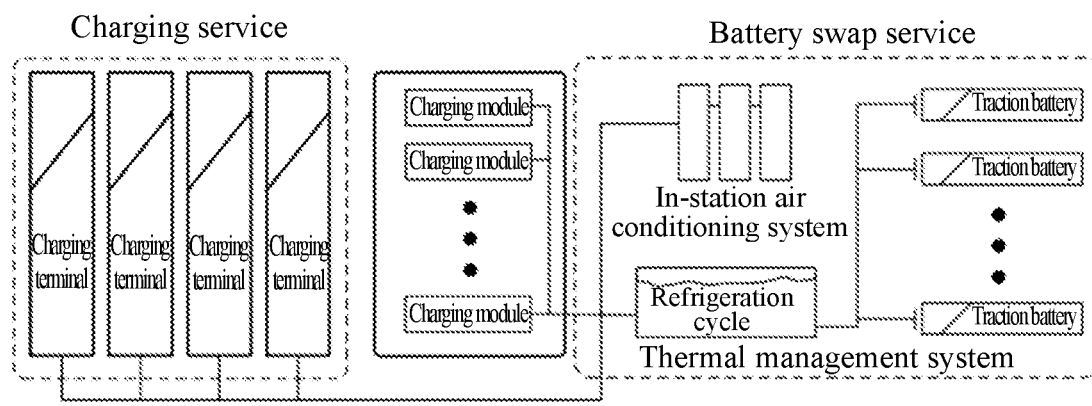
FIG. 1 is a first schematic principle diagram of a thermal management system for a battery charging and swap station in an application scenario in summer of the disclosure.
Figure 2:
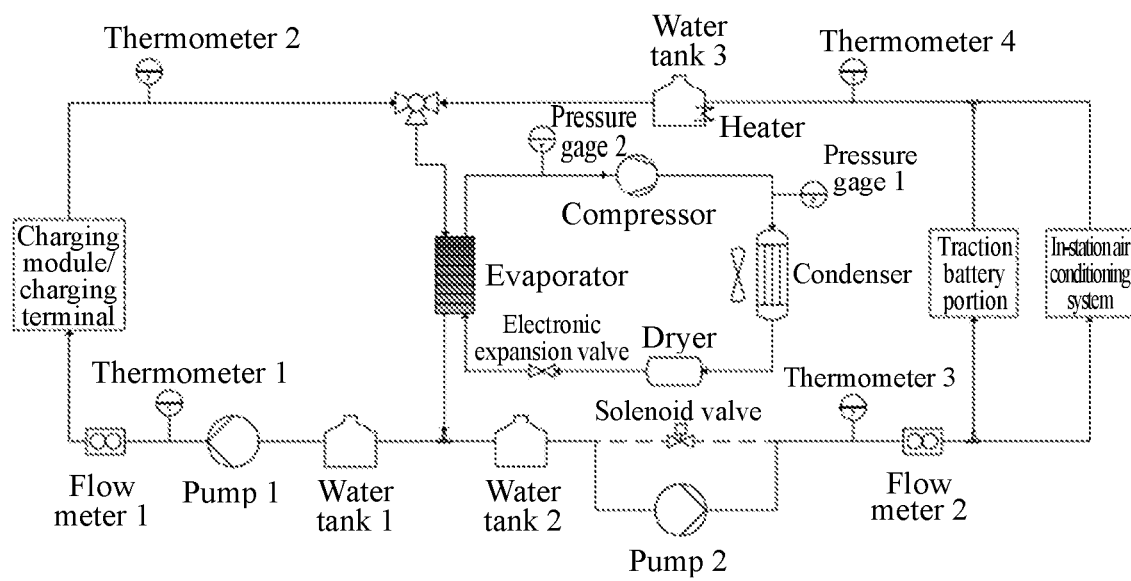
FIG. 2 is a second schematic principle diagram of a thermal management system for a battery charging and swap station in an application scenario in summer of the disclosure.
Figure 3:
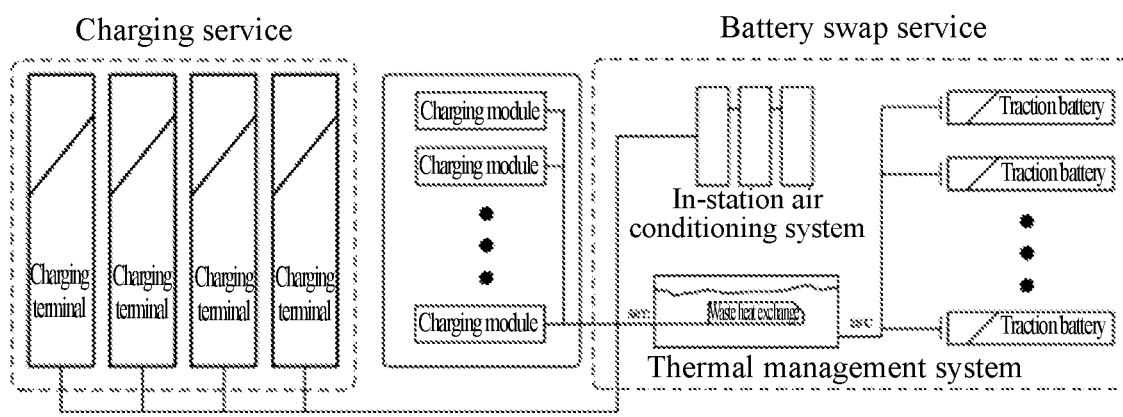
FIG. 3 is a first schematic principle diagram of a thermal management system for a battery charging and swap station in an application scenario in winter of the disclosure.
Figure 4:
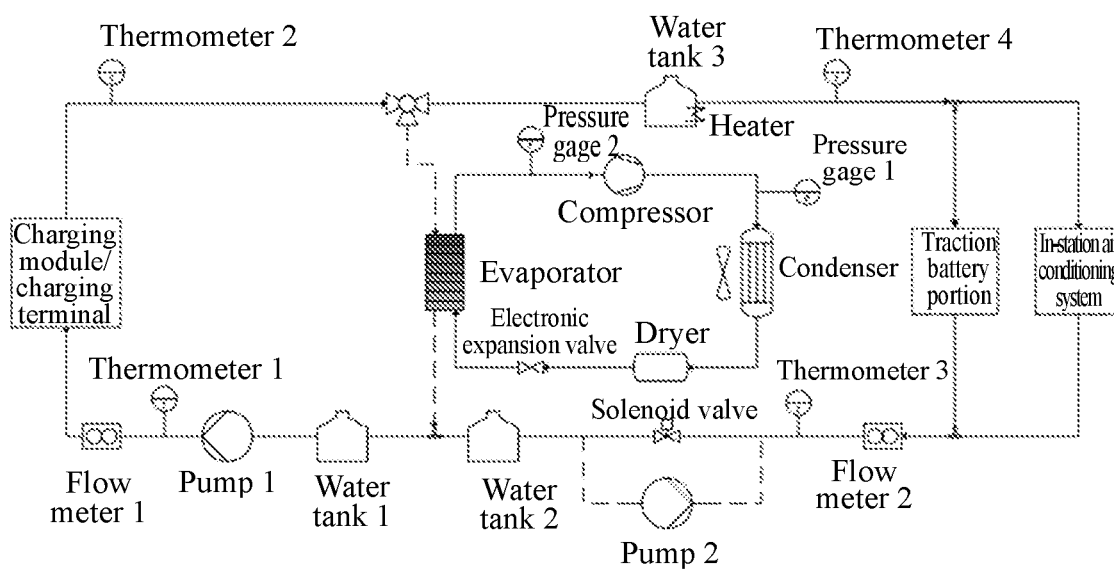
FIG. 4 is a second schematic principle diagram of a thermal management system for a battery charging and swap station in an application scenario in winter of the disclosure.

With reference to FIGS. 1-4, FIG. 1 is a first schematic principle diagram of a thermal management system for a battery charging and swap station in an application scenario in summer of the disclosure, FIG. 2 is a second schematic principle diagram of a thermal management system for a battery charging and swap station in an application scenario in summer of the disclosure, FIG. 3 is a first schematic principle diagram of a thermal management system for a battery charging and swap station in an application scenario in winter of the disclosure, and FIG. 4 is a second schematic principle diagram of a thermal management system for a battery charging and swap station in an application scenario in winter of the disclosure. As shown in FIGS. 1-4, the battery charging and swap station mainly includes a charging module (a liquid-cooled charging module), a traction battery portion (a liquid-cooled traction battery portion, such as a battery compartment capable of accommodating a plurality of power batteries) corresponding to a battery swap service, and a charging terminal (including a plurality of charging piles, etc.) corresponding to a charging service, the charging module being electrically connected to the traction battery portion and the charging terminal separately, so as to provide electric energy for the traction battery portion and the charging terminal. The traction battery portion can accommodate the plurality of power batteries, and provide an energy replenishment service for a corresponding traction battery (a used battery replaced from an electric vehicle). After the electric vehicle to be charged arrives at a charging position in the station, the charging terminal is capable of being plugged into a charging port of the electric vehicle, so as to provide an energy replenishment service for a traction battery configured in the electric vehicle (without removing the used battery from the electric vehicle).

Preferably, the battery charging and swap station further includes an in-station air conditioning system, the in-station air conditioning system being mainly used for adjusting a temperature of an environment (an in-station space) of the battery charging and swap station. In one possible implementation, the disclosure further includes an in-station air conditioning system associated with the thermal management system, such as a simple in-station air conditioning system, that is, a bank of tubes similar to a radiator, so that an ambient temperature of the in-station space is adjusted through heat exchange between a coolant flowing through the bank of tubes and air in the in-station space.

In general, the battery charging and swap station is further configured with a battery swap platform, a battery swap trolley, etc. which are mainly used for assisting in the aforementioned battery swap service. For example, operations related to the battery swap platform, the battery swap trolley, etc. include removing (unloading) the used battery from the electric vehicle, transferring the unloaded used battery to a charging compartment, removing a fully-charged battery replenished with energy from the charging compartment, and mounting (loading) the fully-charged battery to the electric vehicle, etc.

The disclosure further includes a thermal management system, the thermal management system mainly including a heat pump unit and a liquid cool unit group, the heat pump unit including a compressor, a condenser, a throttling component (an electronic expansion valve), and an evaporator which form a refrigerant circulation circuit, and the evaporator that can release cold energy being associated with the liquid cooling unit group, so as to realize a thermal management in the battery charging and swap station. In addition, the heat pump unit is further provided with pressure gages and a dryer (between the condenser and the evaporator), so that heat of a high-temperature coolant is capable of being continuously taken away under the condition that the heat pump unit is in a running state, thereby ensuring a low-temperature quality of the coolant. As in the example, the dryer is additionally provided between the evaporator and the condenser, and a pressure gage 1 and a pressure gage 2 are provided between the compressor and the condenser, and between the evaporator and the compressor, respectively.

In one possible implementation, the liquid cooling unit group mainly includes four liquid cooling units, which are denoted as a first liquid cooling unit, a second liquid cooling unit, a third liquid cooling unit, and a fourth liquid cooling unit, respectively, the first liquid cooling unit being mainly used for recovering heat of the charging module and replenishing the traction battery and the in-station air conditioning system with the heat when necessary, the second liquid cooling unit being mainly used for recovering heat of the traction battery or replenishing the traction battery with the heat, the third liquid cooling unit being mainly used for recovering heat of the charging pile and replenishing the traction battery and the in-station air conditioning system with the heat when necessary, and the fourth liquid cooling unit being mainly used for providing cold energy or heat for the in-station air conditioning system.

(Currently) in general, the traction battery must be kept within a specified temperature range constantly when the traction battery corresponding to a battery swap portion is replenished with energy. Correspondingly, in the disclosure, the second liquid cooling unit is further configured with a special heating component, to assist in such a requirement of the traction battery. The "second liquid cooling unit being mainly used for recovering heat of the traction battery or replenishing the traction battery with the heat" is based on the configured heating component, and thus the second liquid cooling unit is capable of replenishing the traction battery with the heat.

In this way, when the ambient temperature in the battery charging and swap station exceeds a set target temperature (for example, the target temperature is set to a temperature determined by referring to a temperature range of the traction battery, such as 25° C.), a heat pump system runs a refrigeration cycle (the evaporator is capable of releasing cold energy in such a condition). In this way, the low-temperature coolant is capable of being allocated to the traction battery, the charging module, the charging pile, and the in-station air conditioning system. Specifically, by allocating the coolant to the traction battery, and controlling a temperature and a flow of the coolant, the temperature of the traction battery is always within the specified temperature range (the second liquid cooling unit). Further, by allocating the coolant to the charging module, massive heat generated by the charging module in a process of electric energy conversion is taken away, and a low-temperature property of the coolant is ensured by exchanging heat with the evaporator of the heat pump unit (the first liquid cooling unit). By allocating the coolant to the charging terminal, massive heat generated by the charging pile in a process of electric energy conversion is taken away, and a low-temperature property of the coolant is ensured by exchanging heat with the evaporator of the heat pump unit (the third liquid cooling unit). Moreover, by allocating the coolant to the in-station air conditioning system, the in-station space of the battery charging and swap station is cooled, so as to ensure that the ambient temperature in the in-station space is within a comfortable body feeling range (the fourth liquid cooling unit).

In this way, when the ambient temperature in the battery charging and swap station is lower than the set target temperature (for example, the target temperature is still set as the temperature determined by referring to the temperature range of the traction battery, such as 25° C.), the heat pump system does not run the refrigeration cycle (the evaporator is only used as a coolant circulation pipeline for waste heat exchange in such a condition). In such a condition, waste heat recovered from the charging module and the charging terminal is capable of being fully utilized. For example, after the coolant in the thermal management system flows through the charging module and the charging terminal firstly, the heat generated in the charging module (the first liquid cooling unit) and the charging terminal (the third liquid cooling unit) is recovered, so that the coolant is heated to raise a temperature of the coolant. On this premise, the heated coolant is allocated to the traction battery portion, to ensure that the traction battery is within the specified temperature range constantly (the second liquid cooling unit). In addition, the heated coolant is allocated to the in-station air conditioning system, to raise the temperature of the in-station space of the battery charging and swap station, to ensure that the ambient temperature in the in-station space is within the comfortable body feeling range (the fourth liquid cooling unit).

It can be seen that the aforementioned traction battery portion and in-station air conditioning system will require the heat. In such a condition, if it is impossible for the recovered waste heat to satisfy the required heat, the heating component configured at the second liquid cooling unit is capable of being used.

In one possible implementation, the thermal management system includes a heat pump unit, a water tank group, and a valve group, the water tank group including water tank 1 (as a first vessel and a third vessel), water tank 2 (as a second vessel and a fourth vessel), and water tank 3 (as a fifth vessel), water tank 1 and water tank 2 being each configured with pump 1 (as a first pump and a third pump) and pump 2 (as a second pump and a fourth pump), and water tank 3 being configured with a heater as a heating component shared by the second/fourth liquid cooling units. The valve group includes a three-way valve and a solenoid valve, where water tank 1, pump 1, the charging module, the three-way valve, the evaporator, and water tank 1 form the first liquid cooling unit; water tank 2, pump 2, the traction battery portion, water tank 3, the three-way valve, the evaporator, and water tank 2 form the second liquid cooling unit; water tank 1, pump 1, the charging terminal, the three-way valve, the evaporator, and water tank 1 form the third liquid cooling unit; and water tank 2, pump 2, the in-station air conditioning system, water tank 3, the three-way valve, the evaporator, and water tank 2 form the fourth liquid cooling unit; and the solenoid valve is arranged in the second/fourth liquid cooling units in parallel with pump 2.

It can be seen that in the example, the first/third liquid cooling units are integrated to a certain extent, and the second/fourth liquid cooling units are integrated to a certain extent.

In order to ensure the accuracy of the thermal management, the temperature/flow of the coolant are required to be detected. Accordingly, a flow meter (denoted as flow meter 1) is capable of being arranged on a pipeline of the first/third liquid cooling units, and thermometers (denoted as thermometer 1 and thermometer 2) are capable of being arranged on both sides of the charging module/the charging terminal, respectively. Similarly, a flow meter (denoted as flow meter 2) is capable of being arranged on a pipeline of the second/fourth liquid cooling units, and thermometers (denoted as thermometer 3 and thermometer 4) are capable of being arranged on both sides of the charging module/the charging terminal, respectively.

Based on the structures described above, the disclosure is described below in combination with two specific application scenarios.

Scenario One (in Summer):

With continued reference to FIGS. 1 and 2, in such a condition, an ambient temperature is high, so that the heat pump unit runs a refrigeration mode, and pump 2 runs (the solenoid valve is closed). Based on this, pump 1 transports the low-temperature coolant in water tank 1 to the charging module and the charging terminal, separately, to take away the heat generated by the charging module and the charging terminal in a working process, and the coolant is heated after recovering the waste heat of the charging module and the charging terminal. The heated coolant flows to the evaporator of the heat pump system via the first port (a left port) and the third port (a lower port) of the three-way valve, and exchanges heat with a surface of the evaporator, to be cooled, thereby ensuring circularity of liquid cooling. The circuit (the first and third liquid cooling units) is provided with flow meter 1, thermometer 1, and thermometer 2, which are mainly used for detecting a flow rate and a temperature of the coolant. Further, pump 1 transports the low-temperature coolant in water tank 1 to the traction battery and the in-station air-conditioning system, separately, to take away the heat of the traction battery and the in-station space of the battery charging and swap station, and the coolant is heated after recovering the waste heat of the traction battery and the heat in the environment. Similarly, the heated coolant flows to the evaporator of the heat pump system via the second port (a right port) and the third port (the lower port) of the three-way valve, and exchanges heat with the surface of the evaporator, to be cooled, so as to ensure circularity of liquid cooling. The circuit (the second and fourth liquid cooling units) is provided with flow meter 2, thermometer 3, and thermometer 3, which are mainly used for detecting a flow rate and a temperature of the coolant.

Figure 5:
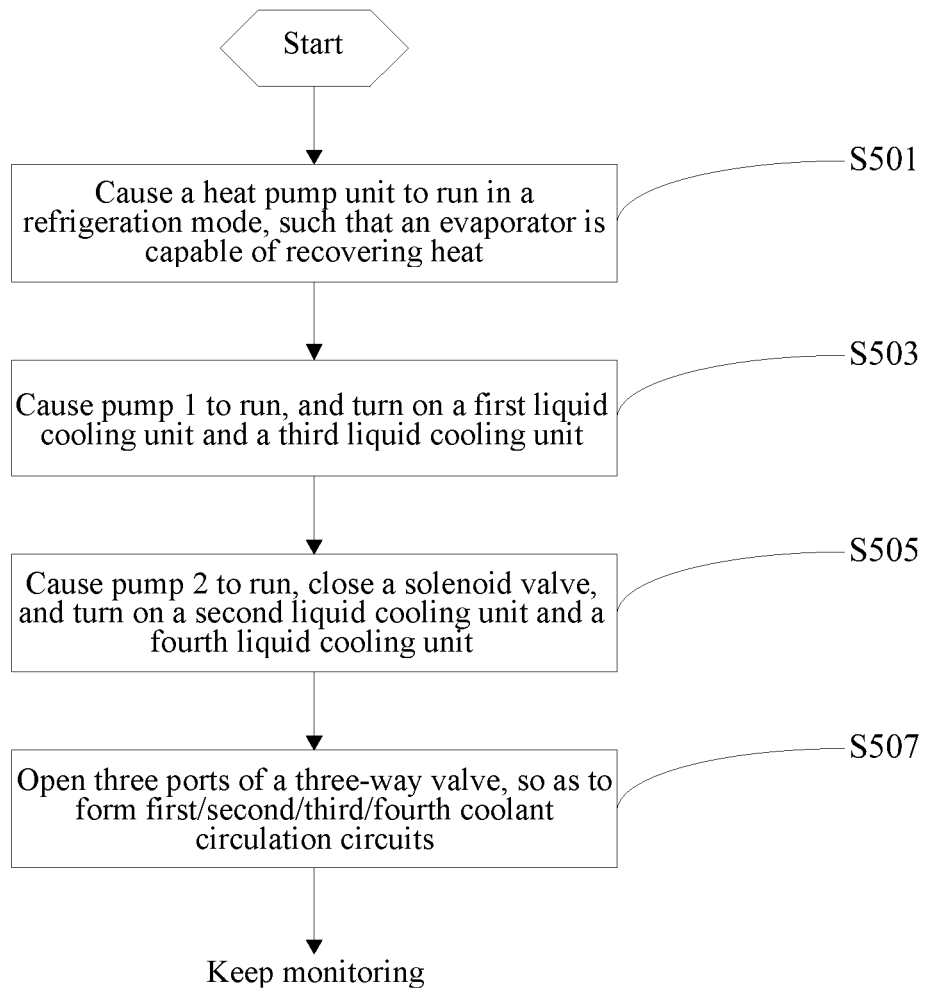
FIG. 5 is a first schematic flow chart (corresponding to an application scenario in summer) of a control method for a thermal management system for a battery charging and swap station of the disclosure.

With reference to FIG. 5, which is the first schematic flow chart of a control method for a thermal management system for a battery charging and swap station of the disclosure. As shown in FIG. 5, in this application scenario, the control method for a thermal management system for a battery charging and swap station mainly includes:

At step 501, a heat pump unit is caused to run in a refrigeration mode.

Based on this, an evaporator is capable of recovering heat, to ensure a low-temperature property of a circulating coolant.

At step 503, pump 1 is caused to run.

Based on this, first/third liquid cooling units are turned on.

At step 505, pump 2 is caused to run, and a solenoid valve is closed.

Based on this, second/fourth liquid cooling units are turned on.

At step 507, a left port, a right port, and a lower port of a three-way valve are all opened.

Based on this, it is ensured that first/second/third/fourth coolant circulation circuits corresponding to the first/second/third/fourth liquid cooling units are formed.

On this premise, a flow, an on-off state and specific opening of relevant valves (such as the three-way valve, and an adjustment valve corresponding to a traction battery portion/an in-station air conditioning system), running parameters of the pumps, etc. are controlled mainly based on a temperature, so as to realize an effective thermal management.

Scenario Two (in Winter):

With continued reference to FIGS. 3 and 4, in such a condition, an ambient temperature is low, so that the heat pump unit does not run, and pump 2 is turned off (the solenoid valve is opened). Based on this, pump 1 transports the low-temperature coolant in water tank 1 and water tank 2 to the charging module and the charging terminal, separately, to take away heat generated by the charging module and the charging terminal in a working process, and the coolant is heated after recovering the waste heat of the charging module and the charging terminal. The heated coolant flows through a left port and a right port of the three-way valve in sequence to water tank 3 configured with the heater. In such a condition, if the heat carried by the coolant can satisfy the requirements of the traction battery and the in-station air conditioning system, the heater does not work, that is, the heat in the coolant is directly transferred to the traction battery (to keep the traction battery within the specified temperature range constantly) and the in-station air conditioning system (to keep the in-station space within the comfortable temperature range). If it is impossible for the heat carried by the coolant to satisfy the requirements of the traction battery and the in-station air conditioning system, the heater configured at water tank 3 is turned on to further heat the coolant to a temperature capable of satisfying the requirements of the traction battery and the in-station air conditioning system. After a heat exchange with the traction battery and the in-station air conditioning system, the coolant is cooled and flows back to water tank 2 and water tank 3 via the solenoid valve.

Figure 6:
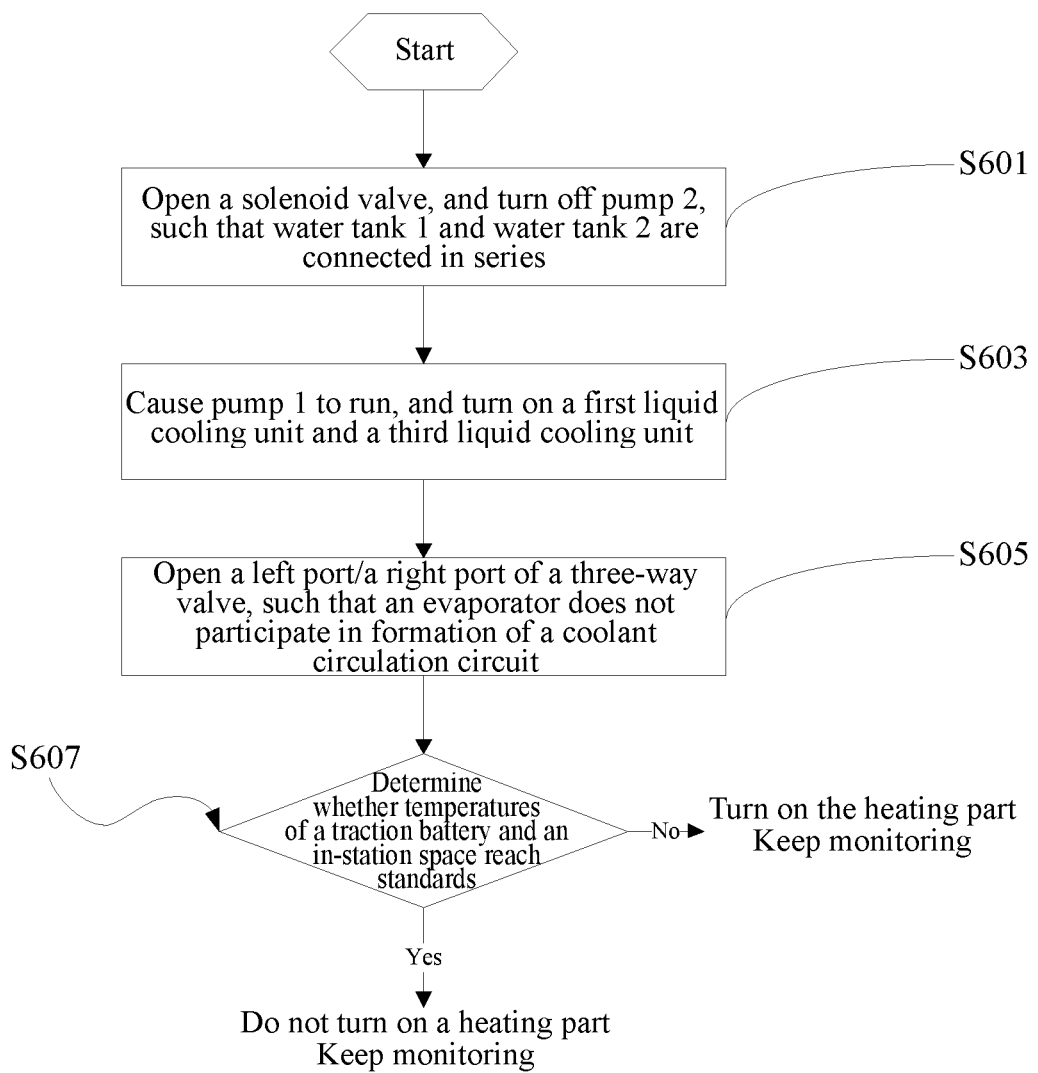
FIG. 6 is a second schematic flow chart (corresponding to an application scenario in winter) of a control method for a thermal management system for a battery charging and swap station of the disclosure.

With reference to FIG. 6, which is a second schematic flow chart of a control method for a thermal management system for a battery charging and swap station of the disclosure. As shown in FIG. 6, in this application scenario, the control method for a thermal management system for a battery charging and swap station mainly includes:

At step 601, a solenoid valve is opened, and pump 2 is turned off.

Based on this, first/third liquid cooling units are turned on.

Also, water tank 1 corresponding to the first/third liquid cooling units and water tank 2 corresponding to the second/fourth liquid cooling unit contain a circulating coolant in a serial manner.

At step 603, pump 1 is caused to run.

Based on this, the first/third liquid cooling units are turned on.

At step 605, a left port and a right port of a three-way valve are opened.

Based on this, an evaporator does not participate in formation of a coolant circulation circuit.

At step 607, it is determined whether temperatures of a traction battery and an in-station space reach standards, and if yes, a heating component configured at water tank 3 is not turned on; and if not, the heating component is turned on.

On this premise, a flow, an on-off state and specific opening of relevant valves (such as the three-way valve, an adjustment valve corresponding to a traction battery portion/an in-station air conditioning system, and the solenoid valve), running parameters of the pumps, running parameters of the heating component, etc. are controlled mainly based on a temperature, so as to realize an effective thermal management.

It should be noted that in the example, the second liquid cooling unit corresponding to the traction battery and the fourth liquid cooling unit corresponding to the in-station air conditioning system are partially integrated in a specific form of one main pipe, and two branch pipes extending from the main pipe and arranged in parallel, and water tank 3 and the heating component are both arranged on the main pipe. If a solenoid valve (not shown) is capable of being configured in each branch pipe, the coolant flowing through the traction battery and the in-station air conditioning system is capable of being rationally allocated by adjusting opening of the solenoid valve. Obviously, this is an exemplary description only, and a person skilled in the art is capable of making rational changes according to the actual situation. For example, the two branch pipes are provided with heating components, respectively, so as to more accurately cope with the heat requirements of the second liquid cooling unit and the fourth liquid cooling unit.

It should be noted that, in the example, the first/third liquid cooling units are a set of pipelines partially integrated, the second/fourth liquid cooling units are a set of pipelines partially integrated, and the two sets of pipelines are further integrated through one three-way valve. Obviously, this is an exemplary description only, and a person skilled in the art is capable of making rational changes according to the actual situation. For example, the four circulation pipelines are capable of being integrated in another manner or independently arranged, and the water tanks, the pumps, and the heating component are not shared.

It should be noted that in the example, water tank 1 and water tank 2 are combined to provide the coolant. Specifically, in application scenario one, the pipeline corresponding to the first/third liquid cooling units and the pipeline corresponding to the second/fourth liquid cooling units are provided with the coolants, respectively (pump 2 is turned on, and water tank 1 and water tank 2 are connected in parallel to provide the coolants). In application scenario two, after the waste heat of the charging module/the charging terminal is recovered in a combined and centralized manner, the coolant carrying heat is provided for the traction battery and the in-station air conditioning system (pump 2 is not turned on, and water tank 1 and water tank 2 are connected in series to provide the coolant). Obviously, this is an exemplary description only, and a person skilled in the art is capable of making rational changes according to the actual situation. For example, Water tank 1 and water tank 2 are combined into a water tank with a sufficient capacity, and corresponding partitions and valves in the tank are used for coping with the two application scenarios. An additional water tank is added, and water tank 2 may be replaced with the additional water tank in application scenario two. The fourth liquid cooling unit is provided with two water tanks, one of which is configured with a pump with a pumping direction opposite to the first/third liquid cooling units, and the other one of which is not configured with a pump or is configured with a pump with the same pumping direction as the first/third liquid cooling units.

It can be seen that in the thermal management system for a battery charging and swap station of the disclosure, through the cooperation among the four liquid cooling units, the thermal management of the components in the battery charging and swap station, including the charging module, the charging terminal, the traction battery portion, and the in-station air conditioning system, can be realized through the cooperation between the heat pump unit and the heating component on the premise of recovering the heat of the charging module and the charging terminal. Based on the structures of the thermal management system described above, the thermal management of the battery charging and swap station is realized by basically controlling the pumps, the heating component, the three-way valve, the solenoid valve, etc. in the system, and further monitoring on the premise.

It should be noted that although all the steps are described in a specific order in the embodiments described above, a person skilled in the art is capable of understanding that in order to realize the effects of the disclosure, different steps are not necessarily executed in such an order, but are executed simultaneously or in another order, or certain steps may be added, replaced, or deleted. For example, basically, S501-S507 are executed simultaneously, and S601-S605 are executed simultaneously.

It should be noted that although the control method formed in the specific manner described above is described as an example, a person skilled in the art can understand that the disclosure is not limited thereto. Actually, a user is capable of flexibly adjusting the related steps, and the parameters, etc. in the steps according to the actual application scenarios, etc. For example, the control method is capable of being adjusted correspondingly according to configuration changes to the thermal management system.

Heretofore, the technical solutions to the disclosure have been described with reference to the preferred implementations shown in the accompanying drawings. However, a person skilled in the art may readily understand that the scope of protection of the disclosure is apparently not limited to these specific implementation. A person skilled in the art is capable of making equivalent changes or substitutions to the related technical features without departing from the principle of the disclosure, and the technical solutions with these changes or substitutions shall all fall within the scope of protection of the disclosure.

What is claimed is:

1. A thermal management system for a battery charging and swap station, wherein the battery charging and swap station comprises a charging module, a traction battery portion, and a charging terminal,
    the charging module being electrically connected to the traction battery portion and the charging terminal, so as to provide electric energy for the traction battery portion and the charging terminal, the traction battery portion being capable of providing an energy replenishment service for a traction battery accommodated therein, and the charging terminal being capable of being electrically connected to an electric vehicle arriving at the station, so as to provide an energy replenishment service for a traction battery configured in the electric vehicle; and
    the thermal management system comprises:
        a heat pump unit comprising a compressor, a condenser, a throttling component, and an evaporator which form a refrigerant circulation circuit;
        a first liquid cooling unit comprising the charging module and the evaporator which form a first coolant circulation circuit;
        a second liquid cooling unit comprising the traction battery portion and the evaporator which form a second coolant circulation circuit; and
        a third liquid cooling unit comprising the charging terminal and the evaporator which form a third coolant circulation circuit,
        wherein the first liquid cooling unit and/or the third liquid cooling unit are/is capable of being in communication with the second liquid cooling unit, so as to transfer heat recovered by the first liquid cooling unit and/or the third liquid cooling unit to the traction battery portion.

2. The thermal management system for a battery charging and swap station according to claim 1, wherein at least the second liquid cooling unit is configured with a heating component.

3. The thermal management system for a battery charging and swap station according to claim 1, wherein the battery charging and swap station is configured with an in-station air conditioning system, the in-station air conditioning system being capable of adjusting an ambient temperature in the battery charging and swap station; and
    the thermal management system further comprises:
        a fourth liquid cooling unit comprising the in-station air conditioning system and the evaporator which form a fourth coolant circulation circuit.

4. The thermal management system for a battery charging and swap station according to claim 3, wherein the first liquid cooling unit and/or the third liquid cooling unit are/is capable of being in communication with the fourth liquid cooling unit, such that the heat recovered by the first liquid cooling unit and/or the third liquid cooling unit is used for adjusting the ambient temperature in the battery charging and swap station.

5. The thermal management system for a battery charging and swap station according to claim 3, wherein the second liquid cooling unit and/or the fourth liquid cooling unit are/is configured with heating components/a heating component.

6. The thermal management system for a battery charging and swap station according to claim 5, further comprising a first vessel, a second vessel, and a third vessel, the first vessel, the second vessel, and the third vessel being configured with a first pump, a second pump, and a third pump, respectively,
    the first vessel, the first pump, and the charging module forming the first liquid cooling unit, the second vessel, the second pump, and the traction battery portion forming the second liquid cooling unit, and the third vessel, the third pump, and the charging terminal forming the third liquid cooling unit.

7. The thermal management system for a battery charging and swap station according to claim 6, further comprising a fourth vessel, the fourth vessel being configured with a fourth pump, and
    the fourth vessel, the fourth pump, and the in-station air conditioning system forming the fourth liquid cooling unit.

8. The thermal management system for a battery charging and swap station according to claim 7, wherein the first liquid cooling unit and the third liquid cooling unit are provided with a common first main pipe, the second liquid cooling unit and the fourth liquid cooling unit are provided with a common second main pipe, and the thermal management system comprises a three-way valve, a first port, a second port, and a third port of the three-way valve being connected to the first main pipe, the second main pipe, and the evaporator, respectively.

9. The thermal management system for a battery charging and swap station according to claim 8, wherein the second liquid cooling unit comprises a fifth vessel, the fifth vessel being arranged on the second main pipe, and the heating component being configured at the fifth vessel.

10. The thermal management system for a battery charging and swap station according to claim 7, wherein the second vessel and/or the fourth vessel are/is arranged to allow communication with the first vessel and/or the third vessel.

11. The thermal management system for a battery charging and swap station according to claim 10, including a switching valve that is capable of being switched between on and off, the switching valve being arranged in parallel with the second pump and/or the fourth pump.

12. A control method for a thermal management system for a battery charging and swap station, where the battery charging and swap station includes a charging module, a traction battery portion, and a charging terminal, the charging module being electrically connected to the traction battery portion and the charging terminal, so as to provide electric energy for the traction battery portion and the charging terminal, the traction battery portion being capable of providing an energy replenishment service for a traction battery accommodated therein, and the charging terminal being capable of being electrically connected to an electric vehicle arriving at the station, so as to provide an energy replenishment service for a traction battery configured in the electric vehicle;

the battery charging and swap station is configured with the thermal management system, including:

a heat pump unit including a compressor, a condenser, a throttling component, and an evaporator which form a refrigerant circulation circuit; and the control method includes:

causing a coolant to recover heat of the charging module and/or the charging terminal; and causing the coolant carrying heat to exchange heat with the evaporator under the condition that at least a temperature level of the traction battery portion is satisfied, and there is a surplus of heat.

13. The control method according to claim 12, where the thermal management system includes:

the "causing a coolant to recover heat of the charging module and/or the charging terminal" includes:

causing the first liquid cooling unit and/or the second liquid cooling unit to be in circulation states/a circulation state; and the condition that "at least a temperature level of the traction battery portion is satisfied" includes:

causing the first liquid cooling unit and/or the third liquid cooling unit to be in communication with the second liquid cooling unit, so that the temperature level of the traction battery portion is satisfied.

14. The control method according to claim 13, where the battery charging and swap station is configured with an in-station air conditioning system, the in-station air conditioning system being capable of adjusting an ambient temperature in the battery charging and swap station; and the "causing the coolant carrying heat to exchange heat with the evaporator under the condition that at least a temperature level of the traction battery portion is satisfied, and there is a surplus of heat" includes:

causing the coolant carrying heat to exchange heat with the evaporator under the condition that the ambient temperature and the temperature level of the traction battery portion are satisfied, and there is a surplus of heat.

15. The control method according to claim 14, where the thermal management system includes:

a fourth liquid cooling unit including the in-station air conditioning system and the evaporator which form a fourth coolant circulation circuit; and the "ambient temperature is satisfied" includes:

causing the first liquid cooling unit and/or the third liquid cooling unit to be in communication with the fourth liquid cooling unit, so that the ambient temperature is satisfied.

16. The control method according to claim 15, where the battery charging and swap station is configured with a heating component; and the control method includes:

turning on the heating component under the condition that the heat is not enough to cope with the ambient temperature and the temperature level of the traction battery portion being satisfied.

17. The control method according to claim 16, where the thermal management system includes a first vessel, a second vessel, a third vessel, and a fourth vessel, the first vessel and the third vessel being each configured with a first pump, a second pump, a third pump, and a fourth pump, the first vessel, the first pump, and the charging module forming the first liquid cooling unit, the second vessel, the second pump, and the traction battery portion forming the second liquid cooling unit, the third vessel, the third pump, and the charging terminal forming the third liquid cooling unit, and the fourth vessel, the fourth pump, and the in-station air conditioning system forming the fourth liquid cooling unit.

18. The control method according to claim 17, where the first liquid cooling unit and the third liquid cooling unit are provided with a common first main pipe, the second liquid cooling unit and the fourth liquid cooling unit are provided with a common second main pipe, and the thermal management system includes a three-way valve, a first port, a second port, and a third port of the three-way valve being connected to the first main pipe, the second main pipe, and the evaporator, respectively; and the "causing the coolant carrying heat to exchange heat with the evaporator" includes:

causing the third port to be in communication with the first port and/or the second port.

19. The control method according to claim 18, where the thermal management system includes a switching valve that is capable of being switched between on and off, the switching valve being arranged in parallel with the second pump and/or the fourth pump; and the control method includes:

closing the second pump and/or the fourth pump, and opening the switching valve under the condition that the coolant carrying heat is required to cope with the ambient temperature and the temperature level of the traction battery portion; and opening the second pump and/or the fourth pump, and closing the switching valve under the condition that the coolant carrying heat exchanges heat with the evaporator.

20. The control method according to claim 18, where the thermal management system includes a fifth vessel, the fifth vessel being arranged on the second main pipe, and the heating member being arranged at the fifth vessel.

\* \* \* \* \*